(12) United States Patent
Etigson et al.

(10) Patent No.: US 12,051,343 B2
(45) Date of Patent: Jul. 30, 2024

(54) MULTIVIEW SYSTEM, METHOD AND DISPLAY FOR RENDERING MULTIVIEW CONTENT, AND VIEWER LOCALISATION SYSTEM, METHOD AND DEVICE THEREFOR

(71) Applicant: EVOLUTION OPTIKS LIMITED, Barbados (BB)

(72) Inventors: Joseph Ivar Etigson, Toronto (CA); Raul Mihali, Westport, CT (US); Jean-Michel Delisle Carter, Terrebonne (CA)

(73) Assignee: EVOLUTION OPTIKS LIMITED, Christ Church (BB)

( * ) Notice: Subject to any disclaimer, the term of this patent is extended or adjusted under 35 U.S.C. 154(b) by 0 days.

(21) Appl. No.: 17/800,511

(22) PCT Filed: Feb. 11, 2021

(86) PCT No.: PCT/IB2021/051135
§ 371 (c)(1),
(2) Date: Aug. 17, 2022

(87) PCT Pub. No.: WO2021/165798
PCT Pub. Date: Aug. 26, 2021

(65) Prior Publication Data
US 2023/0091317 A1    Mar. 23, 2023

Related U.S. Application Data

(60) Provisional application No. 62/978,129, filed on Feb. 18, 2020, provisional application No. 62/978,160, filed on Feb. 18, 2020.

(51) Int. Cl.
G09G 3/00    (2006.01)

(52) U.S. Cl.
CPC .......... *G09G 3/001* (2013.01); *G09G 2354/00* (2013.01); *G09G 2370/02* (2013.01); *G09G 2370/18* (2013.01); *G09G 2370/20* (2013.01)

(58) Field of Classification Search
CPC .............. G09G 3/001; G09G 2370/02; G09G 2370/18; G09G 2370/20; G09G 2354/00;
(Continued)

(56) References Cited

U.S. PATENT DOCUMENTS 9,715,827 B2    7/2017  Ng et al.
9,743,500 B2    8/2017  Dietz et al.
(Continued)

FOREIGN PATENT DOCUMENTS

CA    3055222 A1    9/2018
CA    3055436 A1    5/2019
(Continued)

OTHER PUBLICATIONS

Extended European Search Report in EP Patent Application 21757432.6 dated May 9, 2023, 7 pages.
(Continued)

*Primary Examiner* — Ricardo Osorio
(74) *Attorney, Agent, or Firm* — Knobbe, Martens, Olson & Bear, LLP

(57) ABSTRACT

Described are various embodiments of a multiview system, method and display for rendering multiview content, and viewer localisation system, method and device therefor. In one embodiment, a multiview system is operable to interface with a mobile device of a given viewer, and comprises: a MultiView Display (MVD); a network-interfacing content-controller; one or more emitters disposed and operable to emit a respectively encoded time-variable emission in each of distinct viewing directions; and a mobile application operable on the mobile device of the given user to capture (Continued)

a given one of the encoded time-variable emissions when the mobile device is located so to intersect a corresponding one of the distinct directions so to self-identify the mobile device as being substantially in line with a corresponding one of the distinct viewing directions.

22 Claims, 8 Drawing Sheets

(58) Field of Classification Search
CPC ........... H04B 10/116; H04N 2013/403; H04N 13/31; H04N 13/349; H04N 13/368; H04N 2013/40; H04N 13/351
See application file for complete search history.

(56) References Cited

U.S. PATENT DOCUMENTS

| | | | |
|---|---|---|---|
| 9,792,712 B2 | 10/2017 | Ng et al. | |
| 10,264,247 B2 | 4/2019 | Ng et al. | |
| 10,353,535 B2 | 7/2019 | Ng et al. | |
| 10,362,284 B2 | 7/2019 | Thompson et al. | |
| 10,362,301 B2 | 7/2019 | Ng et al. | |
| 10,404,974 B2 | 9/2019 | Dietz et al. | |
| 10,427,045 B2 | 10/2019 | Thompson et al. | |
| 2007/0035555 A1* | 2/2007 | Tsukagoshi | H04N 13/359 345/589 |
| 2009/0140950 A1* | 6/2009 | Woo | G09G 3/20 345/4 |
| 2009/0157309 A1 | 6/2009 | Won et al. | |
| 2013/0050418 A1* | 2/2013 | Nishioka | H04N 13/128 348/51 |
| 2013/0147852 A1* | 6/2013 | Hsieh | H04N 13/31 345/690 |
| 2014/0016107 A1 | 1/2014 | Coulson | |
| 2014/0333917 A1* | 11/2014 | Payne | G01S 7/4865 356/5.01 |
| 2015/0062314 A1* | 3/2015 | Itoh | H04N 13/254 348/55 |
| 2016/0210100 A1 | 7/2016 | Ng et al. | |
| 2016/0224122 A1 | 8/2016 | Dietz et al. | |
| 2016/0261856 A1* | 9/2016 | Ng | H04N 13/351 |
| 2016/0364087 A1 | 12/2016 | Thompson et al. | |
| 2018/0084245 A1* | 3/2018 | Lapstun | H04N 13/305 |
| 2018/0113593 A1* | 4/2018 | Ng | G06F 3/04845 |
| 2018/0115772 A1 | 4/2018 | Thompson et al. | |
| 2018/0224947 A1 | 8/2018 | Ng et al. | |
| 2019/0019218 A1 | 1/2019 | Thompson | H04N 13/398 |
| 2019/0313069 A1 | 10/2019 | Thompson et al. | |

FOREIGN PATENT DOCUMENTS

| | | | | |
|---|---|---|---|---|
| CN | 103493479 A | * | 1/2014 | ........... H04N 19/114 |
| CN | 107801074 A | * | 3/2018 | ............. G06F 3/165 |
| EP | 1367801 A2 | * | 12/2003 | ........... G06F 1/1626 |
| JP | 5050120 B1 | * | 10/2012 | ........... H04N 13/302 |
| JP | 5132804 B1 | * | 1/2013 | ......... G02B 27/2214 |
| JP | 5134714 B1 | * | 1/2013 | ......... G02B 27/0093 |
| JP | 2013051627 A | * | 3/2013 | ........... H04N 13/128 |
| JP | 2013055645 A | * | 3/2013 | ........... H04N 13/302 |
| KR | 20110090960 A | * | 8/2011 | |
| WO | 2008110991 A1 | | 9/2008 | |
| WO | WO 2008/110991 | | 9/2008 | |
| WO | WO-2008110991 A1 | * | 9/2008 | ......... H04N 13/0409 |
| WO | 2014014603 A3 | | 9/2014 | |
| WO | 2016201412 A1 | | 12/2016 | |
| WO | WO-2018186906 A1 | * | 10/2018 | ............. G02B 27/42 |
| WO | 2018231935 A1 | | 12/2018 | |

OTHER PUBLICATIONS

Jun. 11, 2021 Int'l Search Report from related PCT App. No. PCT/IB2021/51135 (3 pgs).

* cited by examiner

MULTIVIEW SYSTEM, METHOD AND DISPLAY FOR RENDERING MULTIVIEW CONTENT, AND VIEWER LOCALISATION SYSTEM, METHOD AND DEVICE THEREFOR

CROSS REFERENCE TO RELATED APPLICATIONS

This application is the U.S. National Phase Application under 35 U.S.C. § 371 of International No. Application PCT/IB2021/051135, filed Feb. 11, 2021, which claims priority to U.S. Application No. 62/978,160, filed on Feb. 18, 2020 and 62/978,129, filed on Feb. 18, 2020, the entire disclosure of each of which is hereby incorporated by reference.

FIELD OF THE DISCLOSURE

The present disclosure relates to multiview displays (MVD) and systems, and, in particular, to a multiview system, method and display for rendering multiview content, and viewer localisation system, method and device therefor.

BACKGROUND

A multiview display (MVD) is a display that can present distinct images or information in different viewing directions simultaneously. In some instances, a MVD may be used to provide viewer-related content, which requires knowing, at least in part, the location and/or corresponding viewing direction of each target user/viewer.

In general, view directionality may be provided through, for instance, the use of parallax barriers. In such systems, a parallax barrier may allow light from certain pixels to be seen from designated viewing angles, while blocking light from propagating to other viewing angles.

While such systems may allow for stereoscopic viewing or displaying direction-specific content, they often have a low tolerance on viewing angles, wherein even slight deviation in viewer position may expose a user to pixels illuminated for a different viewing zone. Such crosstalk may result in a poor viewing experience.

For instance, International Patent Application WO 2014/014603 A3 entitled "Crosstalk reduction with location-based adjustment" and issued to Dane and Bhaskaran on Sep. 4, 2014 discloses a location-based adjustment system for addressing crosstalk in MVD systems.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a multiview viewer localization system, method and device, and multiview display and system using same, that overcome some of the drawbacks of known techniques, or least, provide a useful alternative thereto.

A further or alternative need exists for a system, method and multiview display (MVD) for rendering multiview content that overcome some of the drawbacks of known techniques, or at least, provides a useful alternative thereto. Examples of such methods, systems and MVDs are described herein.

In accordance with another aspect, there is provided a multiview system operable to interface with a mobile device of a given viewer, the system comprising: a MultiView Display (MVD) operable to display distinct content in two or more distinct viewing directions relative to the MVD; a network-interfacing content-controller operable to select direction-specific content to be displayed by the MVD along each of said distinct viewing directions; one or more emitters disposed and operable to emit a respectively encoded time-variable emission in each of said distinct viewing directions, wherein each said encoded time-variable emission is associated with a respective one of said viewing directions; and a mobile application operable on the mobile device of the given user to capture a given one of said encoded time-variable emissions when the mobile device is located so as to intersect a corresponding one of said distinct directions so to self-identify the mobile device as being substantially in line with a corresponding one of said distinct viewing directions, and communicate viewer-related data and a direction-related identifier identifiable from said given one of said encoded time-variable emission to said content-controller; wherein said network-interfacing content controller is further operable to:

receive communication of said viewer-related data and direction-related identifier; select content based on said viewer-related data and said direction-related identifier to be displayed along said given one of said distinct viewing directions; and invoke display of said selected content via said MVD along said given one of said distinct viewing directions.

In one embodiment, the encoded time-variable emission comprises an encoded pulsatile waveform.

In one embodiment, the one or more emitters comprise one or more infrared (IR) or near-IR (NIR) emitters.

In one embodiment, the pulsatile waveform has a frequency of 38 kHz.

In one embodiment, each of said one or more emitters comprises a light source installed recessed in a sleeve so as to impart directionality to said encoded emission thereof.

In one embodiment, the one or more emitters comprise a beam-forming optics disposed so as to impart directionality to said encoded emission thereof.

In one embodiment, the one or more emitters comprise a directional laser light source.

In one embodiment, the selected content comprises at least one of a text, an image, a video, a symbol, an icon or a code.

In one embodiment, the selected content comprises text, and wherein said viewer-related data comprises a viewer language preference.

In one embodiment, the one or more emitters comprises multiple emitters respectively disposed so to correspond with each of said distinct viewing directions.

In accordance with another aspect, there is provided a computer-implemented method, implemented by one or more digital data processors, for displaying viewer-related content along a given view direction of a MultiView Display (MVD), the MVD operable to display distinct viewer-related content in two or more distinct viewing directions relative to the display, the method comprising: emitting respective encoded time-variable emissions, wherein each of said encoded time-variable emissions is substantially aligned with and encodes a corresponding viewing direction of the MVD; capturing via an optical sensor of a portable communication device located within a given view direction a corresponding encoded time-variable emission; extracting a direction-related identifier from said corresponding encoded time-variable emission; communicating, via said portable communication device, viewer-related data, and a direction-related identifier identifiable from said corresponding encoded time-variable emission, to a network-interfacing content controller communicatively linked to the MVD; selecting, via said content controller, viewer-related content based on said viewer-related data; and displaying, via said content controller and the MVD, said viewer-related content in said given view direction corresponding to said direction-related identifier.

In one embodiment, the encoded time-variable encoded emission comprises an encoded pulsatile waveform.

In one embodiment, the pulsatile waveform has a frequency of 38 kHz.

In accordance with another aspect, there is provided a computer-readable medium comprising digital instructions to be implemented by a digital data processor to automatically implement any one or more of the above methods.

In accordance with another aspect, there is provided a multiview content selection system for selecting viewer-related content to be displayed along respective views of a MultiView Display (MVD) that is operable to display distinct content in two or more distinct viewing directions, the system comprising: a network-interfacing content-controller operable to select direction-specific content to be displayed by the MVD along each of said distinct viewing directions; one or more emitters disposed and operable to emit a respectively encoded time-variable emission in each of said distinct viewing directions, wherein each said encoded time-variable emission encodes is associated with a respective one of said viewing directions; and a mobile application operable on a mobile device of a given viewer to receive a given one of said encoded time-variable emissions when the mobile device is located so to intersect a corresponding one of said distinct directions so to self-identify the mobile device as being substantially in line with a corresponding one of said distinct viewing directions, and communicate viewer-related data and a direction-related identifier identifiable from said given one of said encoded time-variable emission to said content-controller; wherein said network-interfacing content controller is further operable to: receive communication of said viewer-related data and said direction-related identifier; select content based on said viewer-related data; and invoke display of said selected content via the MVD along said corresponding one of said distinct viewing directions corresponding with said direction-related identifier.

In one embodiment, the system further comprises the MVD.

In one embodiment, the MVD comprises a dynamically variable MVD operable to dynamically vary angular view zone boundaries, and wherein said one or more emitters are operable to correspondingly vary emission of each said respectively encoded time-variable emission in each of said distinct viewing directions in concert with said dynamically variable MVD.

In one embodiment, the encoded time-variable emission comprises an encoded pulsatile waveform.

In one embodiment, the one or more emitters comprise one or more infrared (IR) or near-IR (NIR) emitters.

In one embodiment, each of said one or more emitters comprises at least one of a light source installed recessed in a sleeve so as to impart directionality to said encoded emission thereof, a beam-forming optics disposed so as to impart directionality to said encoded emission thereof, or a directional laser light source.

In one embodiment, the one or more emitters comprises multiple emitters respectively disposed so to correspond with each of said distinct viewing directions.

In accordance with one aspect, there is provided a multiview display (MVD) for displaying respective content in respective view zones, the MVD comprising: a set of digital pixels; light field shaping elements disposed relative to said set of digital pixels; and a digital processor operable to activate, for each of the respective content, correspondingly alternating adjacent subsets of the set of pixels so to display each of the respective content in their respective view zones when viewed via said light field shaping elements; wherein said digital processor is further operable to allocate a buffer pixel between each of said alternating adjacent subsets of the set of pixels such that any two adjacently activated pixels corresponding to distinct view zones are physically separated by a corresponding buffer pixel.

In one embodiment, each said buffer pixel comprises an inactive pixel.

In one embodiment, each said buffer pixel comprises an active pixel set to a designated buffer value.

In one embodiment, each of said subsets comprises a cluster of cohesively distributed pixels.

In one embodiment, each of said clusters comprises an M×N array of cohesively distributed pixels.

In one embodiment, M and N are between 1 and 10.

In one embodiment, M and N are between 2 and 4.

In one embodiment, M is equal to N.

In one embodiment, at least one of M or N comprises 4 pixels, and wherein each said buffer pixel comprises a single pixel.

In one embodiment, each of said clusters defines a corresponding strip of cohesively distributed pixels in which one of M or N is much greater than the other.

In one embodiment, the digital processor is operable to allocate multiple buffer pixels between each of said alternating adjacent subsects.

In one embodiment, the light field shaping elements are defined by at least one of a 1D or 2D parallax barrier, lenslet array, lenticular array, or waveguide.

In one embodiment, the correspondingly alternating adjacent subsets of the set of pixels are allocated in one or two dimensions correspondingly spreading the respective view zones in one or two directions.

In accordance with another aspect, there is provided a computer-implemented method, automatically implemented by a digital processor operable to activate a set of pixels of a Multiview Display (MVD) so to display respective content to be viewed in corresponding view zones defined by the MVD, the method comprising: for each of the respective content, activating correspondingly alternating adjacent subsets of the set of pixels so to display each of the respective content in their respective view zones; allocating a buffer pixel between each of said alternating adjacent subsets of the set of pixels such that any two adjacently activated pixels corresponding to distinct view zones are physically separated by a corresponding buffer pixel.

In one embodiment, the allocating comprises inactivating each said buffer pixel.

In one embodiment, the allocating comprises activating each said buffer pixel in accordance with a designated buffer value.

In one embodiment, each of said subsets comprises a cluster of cohesively distributed pixels.

In one embodiment, the allocating comprises allocating multiple buffer pixels between each of said alternating adjacent subsets.

In accordance with another aspect, there is provided a computer-readable medium comprising instruction operable by a digital data processor to implement any one or more of the above-noted methods.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

Figure 1:
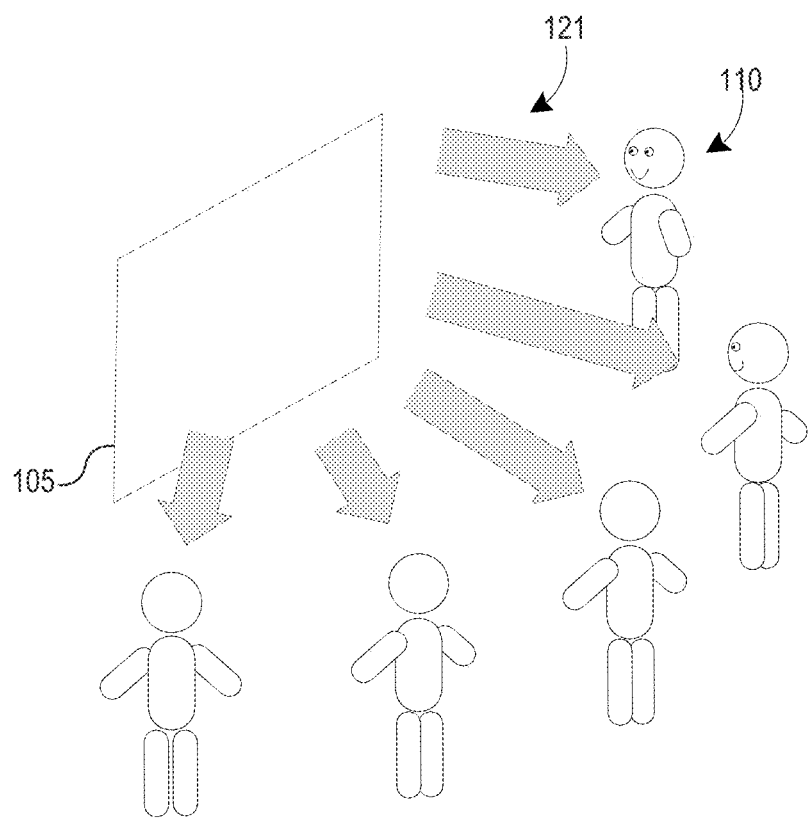
FIG. 1 is a schematic diagram of an illustrative MultiView Display (MVD) operable to display distinct content in different view directions, in accordance with one embodiment.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Unless defined otherwise, all technical and scientific terms used herein have the same meaning as commonly understood by one of ordinary skill in the art to which this disclosure belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "comprising" as used herein will be understood to mean that the list following is non-exhaustive and may or may not include any other additional suitable items, for example one or more further feature(s), component(s) and/or element(s) as appropriate.

The terms "view", "view zone", and "viewing zone", used herein interchangeably, refer to a one-, two-, or three-dimensional region of space wherein an image or other content displayed by a MVD is viewable by a user. A view zone may also refer to an angular distribution of space projected radially from a MVD, or a portion thereof. In accordance with various embodiments, a view zone may correspond to one pupil of a user, or may correspond to a user as a whole. For instance, neighbouring view zones may correspond to areas in which content may be seen by different users. The skilled artisan will appreciate that a view zone, in accordance with various embodiments, may repeat, or have multiple instances, in 2D or 3D space based on the operational mode of an MVD in use.

The systems and methods described herein provide, in accordance with different embodiments, different examples of a multiview viewer localization system, method and device, and multiview display and system using same. In these or alternative embodiments, a system and method is provided for improving a user experience while viewing a multiview display (MVD).

While various embodiments may apply to various configurations of MVD systems known in the art, exemplary MVD systems with which the systems and methods described herein may apply will now be described with reference to FIGS. 1 to 6. Such examples are not intended to limit the scope of the systems and methods herein described, and are included to provide context, only, for non-limiting exemplary MVD systems.

Known MVD systems can be adapted to display viewer-related information in different MVD directions based on viewer identification and location information acquired while the user is interacting with the MVD. This can be achieved using facial or gesture recognition technologies using cameras or imaging devices disposed around the MVD. However, viewers can become increasingly concerned about their privacy, and generally uncomfortable with a particular technology, when subject to visual tracking, for instance not unlike some form of application-specific video surveillance. To address this concern, and in accordance with some embodiments, a viewer self-identification system and method can be deployed in which active viewer camera monitoring or tracking can be avoided. That being said, the person of ordinary skill in the art will readily appreciate that different user localization techniques may be employed in concert with the herein-described embodiments to benefit from reduced ghosting or cross-talk, where such provisions are deployed, wherein users can self-locate by capturing a direction or zone-specific signal, by entering a zone or direction-specific alphanumerical code or symbol, or by executing prescribed gestures or actions for machine vision interpretation, or again position themselves in accordance with prescribed and/or static view zones or directions. Likewise, the anti-ghosting techniques described herein may equally apply to user-agnostic embodiments in which direction or zone-specific content is displayed irrespective of user-related data, i.e. independent as to whether a particular, or even any user, is located within a prescribed or dynamically definable view zone.

For the sake of illustration, and in accordance with some embodiments, a multiview self-identification system and method are described to relay viewing direction, and optionally viewer-related data, in a MVD system so as to enable a given MVD to display location and/or viewer-related content to a particular viewer in or at a corresponding viewing direction or location, without otherwise necessarily optically tracking or monitoring the viewer. According to such embodiments, a viewer who does not opt into the system's offering can remain completely anonymous and invisible to the system. Furthermore, even when opting into the system's offerings at a particular location, the viewer can find greater comfort in knowing that the system does not, at least in some embodiments, capture or track visual data related to the viewer, which can otherwise make viewers feel like they are being actively watched or observed.

In one particular embodiment, this improvement is achieved by deploying a network-interfacing content-controller operable to select direction-specific content to be displayed by the MVD along each of distinct viewing directions in response to a viewer and/or location-participating signal being received from a viewer's personal communication device. Such an otherwise effectively blind MVD does not require direct locational viewer tracking and thus, can be devoid of any digital vision equipment such as cameras, motion sensors, or like optical devices. Instead, position or directional view-related information can be relayed by one or more emitters disposed relative to the MVD and operable to emit respective encoded signals in each of said distinct viewing directions that can be captured by a viewer's communication device and therefrom relayed to the controller to instigate display of designated content along that view. Where viewer-related data is also relayed by the viewer's communication device along with a given encoded signal, the displayed content can be more specifically targeted to that viewer based on the relayed viewer-related data. In some embodiments, to improve the usability of the system, encoded signals may be emitted as time-variable signals, such as pulsatile and optionally invisible (e.g. InfraRed (IR) or Near InfraRed (NIR)) signals constrained to a particular view zone (e.g. having an angularly constrained emission beam profile bounded within each view zone), whereby such signals can be captured and processed by a viewer's camera-enabled communication device. These and other such examples will be described in greater detail below.

With reference to FIG. 1, and in accordance with one embodiment, a MVD system will now be described. In this embodiment, an exemplary MVD 105 is illustrated comprising a digital display that can display two or more different images (or multimedia content) simultaneously with each image being visible only from a specific viewing direction. In this example, different viewers/users are viewing MVD 105 from different viewing directions, each viewer potentially seeing distinct content simultaneously. A passive or user-indiscriminate implementation could alternatively display different direction-specific content without viewer input, that is, irrespective of which viewer is located at any of the particular locations.

However, it may be desirable to present or display viewer-related content to a given viewer, say for example viewer 110 currently seeing MVD 105 from a specific viewing direction 121. To do so, MVD 105 must first know from which viewing direction viewer 110 is currently viewing MVD 105. As noted above, while technologies or methods may be used on MVD 105 to actively monitor body features (e.g. face recognition), body gestures and/or the presence of wearable devices (e.g. bracelets, etc.) of potential viewers, these technologies can be intrusive and bring privacy concerns. So, instead of having MVD 105 localizing/identifying viewer 110 itself, the methods and systems described herein, in accordance with different embodiments, therefore aim to provide viewer 110 with the ability to "self-identify" himself/herself as being in proximity to MVD 105 via a mobile device like a smartphone or like communication device, and send thereafter self-identified viewing direction/location data and in some cases additional viewer-related data to MVD 105, so that MVD 105 may display viewer-related content to viewer 110 via view direction 121.

In one non-limiting example, for illustrative purposes, MVD 105 may be implemented to display arrival/departing information in an airport or like terminal. The systems and methods provided herein, in accordance with different embodiments, may be employed with a system in which a viewing direction 121 can be used to display the same flight information as in all other views, but in a designated language (e.g. English, Spanish, French, etc.) automatically selected according to a pre-defined viewer preference. In some embodiments, a self-identification system could enable MVD 105 to automatically respond to a viewer's self-identification for a corresponding viewing direction by displaying the information for that view using the viewer's preferred language. In a similar embodiment, the MVD could be configured to display this particular viewers flight details, for example, where viewer-related data communicated to the system extends beyond mere system preferences such as a preferred language, to include more granular viewer-specific information such as upcoming flight details, gates, seat selections, destination weather, special announcements or details, boarding zone schedule, etc.

Generally, MVD 105 discussed herein will comprise a set of image rendering pixels and a light field shaping layer or array of light field shaping elements disposed either onto or at a preset distance therefrom so to controllably shape or influence a light field emanating therefrom. In some embodiments, the MVD 105 may be a lenticular MVD, for example comprising a series of vertically aligned or slanted cylindrical lenses (e.g. part of a lenticular sheet or similar) or parallax barriers of vertically aligned apertures, located or overlaid above a pixelated display, although the systems and methods described herein may work equally well for any type of MVD or any 1D or 2D display segregating distinct views by location or orientation, including x and/or y. For example, a 1D or 2D MVD may layer a 2D microlens array or parallax barrier to achieve projection of distinct views along different angles spread laterally and/or vertically.

In accordance with some embodiments, a MVD may include a dynamically variable MVD in that an array of light shaping elements, such as a microlens array or parallax barrier, can be dynamically actuated to change optical and/or spatial properties thereof. For example, a liquid crystal array can be disposed or integrated within an MVD system to create a dynamically actuated parallax barrier, for example, in which alternating opaque and transparent regions (lines, "apertures", etc.) can be dynamically scaled based on different input parameters. In one illustrative example, a 1D parallax barrier can be dynamically created with variable line spacing and width such that a number of angularly defined views, and viewing region associated therewith, can be dynamically varied depending on an application at hand, content of interest, and/or particular physical installation. In a same or alternative embodiment in which view zone-defining light field shaping elements are disposed to form a layer at a distance from an underlying pixelated digital display, for example, this distance can also, or alternatively, be dynamically controlled (e.g. servo-actuated) to further or otherwise impact MVD view zone determination and implementation. As such, not only can user-related content be selectively displayed according to different view directions, so can the different view directions be altered for instance, to increase a view zone angle spread, repetition frequency, etc. In such embodiment, user self-localisation techniques as described herein may be adjusted accordingly such that user self-localisation signals are correspondingly adjusted to mirror actuated variations in MVD view zone characterization and implementation.

Figure 2A:
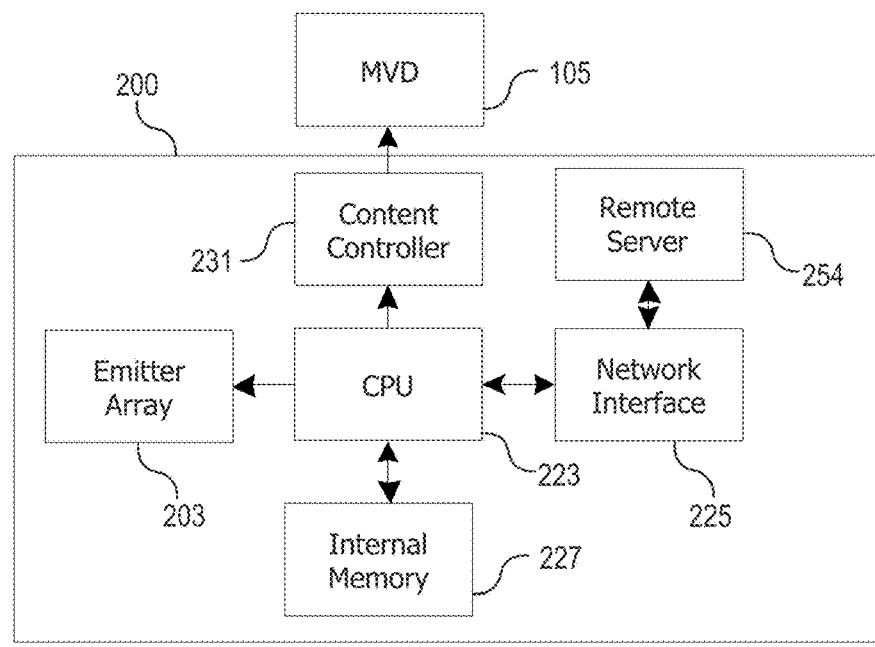
FIGS. 2A, 2B and 2C are schematic diagrams illustrating a multiview self-identification system, a mobile device to be used therewith, and a schematic diagram of a self-identification system and mobile device interacting together, respectively, in accordance with one embodiment.
Figure 2B:
Figure 2C:
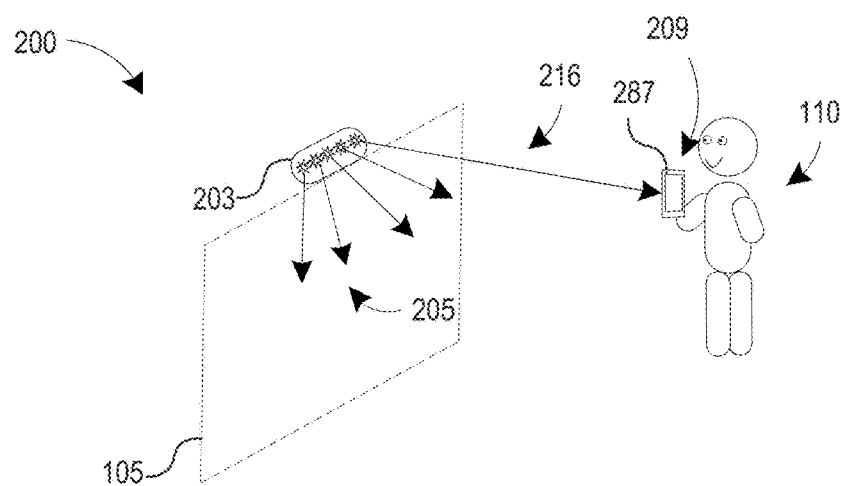

With reference to FIGS. 2A to 2C, and in accordance with different exemplary embodiments, a multiview self-identification system for providing viewing direction data to a MVD so as to enable this MVD to provide viewer-related content to a viewer in a corresponding viewing direction, generally referred to using the numeral 200, will now be described. Self-identification system 200 is generally communicatively linked to MVD 105. In some embodiments, system 200 may be embedded in MVD 105, or it may be provided as a separate device and be attached connected to an existing MVD 105. System 200 generally further comprises an emitter array 203 comprising one or more emitters, each operable to emit highly directional (time-dependent or variable) encoded emissions. In some embodiments, emitter array 203 comprises one or more emitters, each emitter configured to emit a time-dependent encoded emission (e.g. blinking light or other pulsatile waveform), the emission being substantially in-line, directionally-aligned or parallel to, a corresponding viewing direction of the MVD, so as to be only perceived (or preferentially perceived) by a viewer, camera or sensor when a viewer is viewing the MVD from this corresponding view direction. This is schematically illustrated in FIG. 2C, which shows emitter array 203 being located, as an example, above or on top of MVD 105, and emitting therefrom a multiplicity of highly directional encoded emissions 205. Viewer 110 is shown using a camera 287 of his/her mobile device 209 to intercept encoded emission 216, which is the only one visible from his/her location, and which corresponds to that particular viewing direction (e.g. viewing direction 121 of FIG. 1). Naturally, in embodiments where view zone boundaries or characteristics are dynamically actuated via a dynamically actuated MVD, zone-specific user self-localization signals may be equally adjusted to mirror any corresponding spatial changes to the view zone definitions, such as via mechanical (mechanically actuated/reoriented emitters), optical (actuated emission beam steering/forming optics) or like mechanisms.

Generally, emitter array 203 may be located or installed within, on or close to MVD 105, so as to be in view of a viewer (or a mobile device 209 held thereby) viewing MVD 105. In some embodiments, due to the directionality of the emitted emissions, a viewer within a given view direction of MVD 105 may only be able to perceive one corresponding encoded emission 216 from one corresponding emitter.

Generally, mobile device 209 as considered herein may be any portable electronic device comprising a camera or light sensor and operable to send/receive data wirelessly. This is schematically illustrated in FIG. 2B, wherein mobile device 209 comprises a wireless network interface 267 and a digital camera 287. Mobile device 209 may include, without limitation, smartphones, tablets, e-readers, wearable devices (watches, glasses, etc.) or similar. Wireless network interface 267 may be operable to communicate wirelessly via Wi-Fi, Bluetooth, NFC, Cellular, 2G, 3G, 4G, 5G and similar. In some embodiments, digital camera 287 may be sensitive to IR light or NIR light, such that an encoded IR or NIR signal 216 can be captured thereby without adversely impacting the viewer's experience and/or distracting other individuals in the MVD's vicinity. Other non-visible signals can also be considered.

Accordingly, in some embodiments, emitter array 203 may comprise infrared (IR) emitters configured to emit IR light, wherein the encoded emission is a time-dependent pulsatile waveform or similar (e.g. blinking IR light having a direction-encoded pulsatile waveform, frequency, pattern, etc.). In some embodiments, the 38 kHz modulation standard may be used, however, other time-dependent signal encoding (analog or digital) known in the art may be used. Thus, using an IR sensitive digital camera 287, an encoded IR emission may be recorded/intercepted while being invisible to viewer 110, so to not cause unnecessary discomfort.

In some embodiments, the frequency of the encoded emission or a change thereof may, at least in part, be used to differentiate between different emitters of emitter array 203 (e.g. in case of unintended cross-talk between emitters). For example, a specific pulsatile frequency may be used for different view directions.

Thus, in some embodiments, system 200 may further comprise a dedicated application or software (not shown) to be executed on mobile device 209, and which may have access to one or more hardware digital cameras therein. This dedicated application may be operable to acquire live video using a camera of mobile device 209, identify within this video an encoded emission if present and automatically extract therefrom viewing direction or location data.

Furthermore, emitter array 203 may have the advantage that it only requires viewer 110 to point a camera in the general direction of MVD 105 and emitter array 203, whereby the encoded time-variable signal is projected in an angularly constrained beam that sweeps a significant volume fraction of its corresponding view zone (i.e. without spilling over into adjacent zones), avoiding potentially problematic camera/image alignment requirements that could otherwise be required if communicating directional information via a visible graphic or code (e.g. QR code). Given such considerations, even if during acquisition the location of the camera/sensor changes (e.g. due to hand motion, etc.), the dedicated application may be operable to follow the source of encoded emission 216 over time irrespective of specific alignment or stability.

In some embodiments, system 200 may further comprise a remote server 254, which may be, for example, part of a cloud service, and communicate remotely with network interface 225. In some embodiments, content controller 231 may also be operated from remote server 254, such that, for example, viewer-specific content can be streamed directly from remote server 254 to MVD 105.

In some embodiments, multiple MVDs may be networked together and operated from, at least partially, remove server 254.

Figure 3A:
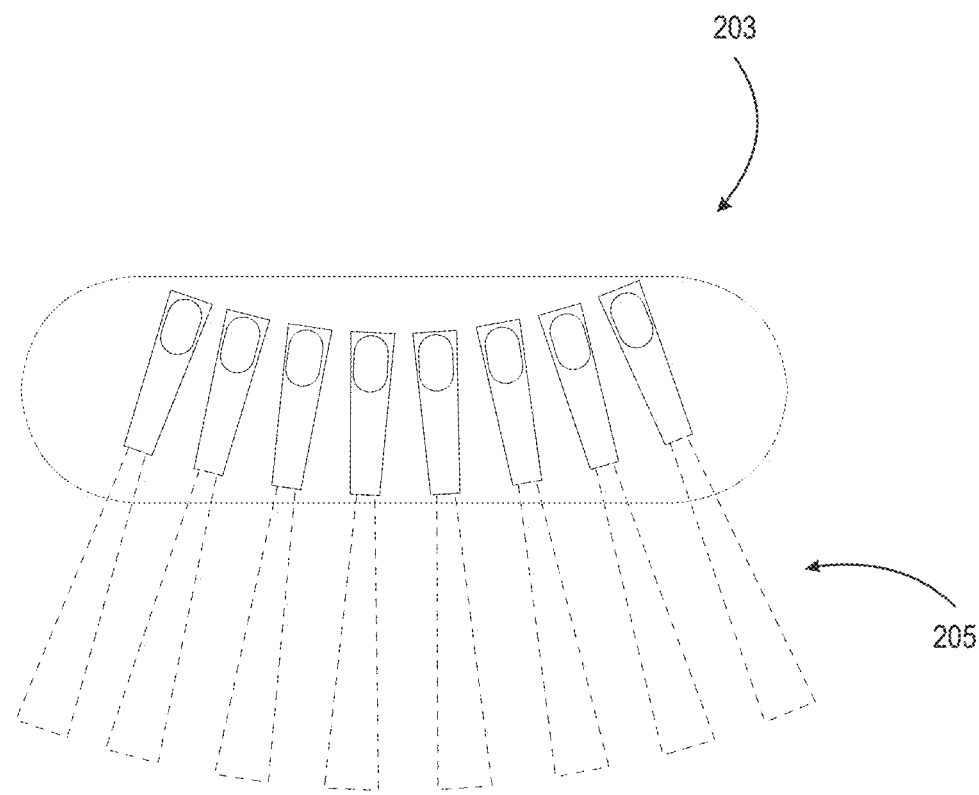
FIGS. 3A and 3B are schematic diagrams of an emitter array and an emitter, respectively, in accordance with one embodiment.
Figure 3B:
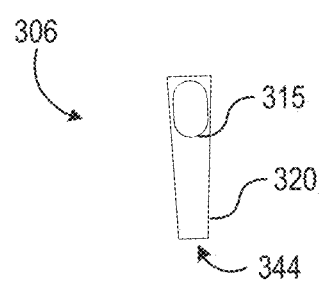

FIGS. 3A and 3B show a schematic diagram of an exemplary emitter array 203 and one exemplary emitter 306 therefrom, respectively. FIG. 3A shows emitter array 203 comprising (as an example only) 8 IR emitters configured to emit directionally encoded emissions 205. In some embodiments, as explained above, each IR emitter in emitter array 203 is configured/aligned/oriented so that the IR light/emission emitted therefrom is aligned with a viewing direction of MVD 105. In some embodiments, the relative orientation of each emitter may be changed manually at any time, for example in the case where emitter array 203 is to be installed on a different MVD. FIG. 3B shows an exemplary emitter 306, which may comprise an IR LED 315 operable to emit IR light at a given pulsatile modulation, a sleeve/recess/casing 320 for blocking IR light from being emitted outside the intended orientation/direction, and an opening 344 for the light to exit.

Other configurations of emitter array 203 or emitter 306 may be considered, without departing from the general scope and nature of the present disclosure. For example, directional light sources, such as lasers and/or optically collimated and/or angularly constrained beam forming devices may serve provide directional emissions without physical blockers or shutters, as can other examples readily apply.

With continued reference to FIGS. 2A to 2C, self-identification system 200 may further comprise a processing unit 223, a network interface 225 to receive view direction identification data from personal mobile device 209 and/or any other viewer-related data (directly or indirectly), a data storage unit or internal memory 227 to store viewing direction data and viewer-related data, and a content controller operable to interface and control MVD 105. Internal memory 227 can be any form of electronic storage, including a disk drive, optical drive, read-only memory, random-access memory, or flash memory, to name a few examples. Internal memory 227 also generally comprises any data and/or programs needed to properly operate content controller 231, emitter array 203, and content controller 231.

In some embodiments, network interface 225 may send/receive data through the use of a wired or wireless network connection. The skilled artisan will understand that a different means of wirelessly connecting electronic devices may be considered herein, such as, but not limited to, Wi-Fi, Bluetooth, NFC, Cellular, 2G, 3G, 4G, 5G or similar.

In some embodiments, the user may be required to provide input via mobile device 209 before the viewing direction data is sent to MVD 105.

As mentioned above, in some embodiments, at any time viewer 110 finds themself in proximity to MVD 105, they can opt to open/execute a dedicated application on their portable digital device 209 to interface with the system. In other embodiments, this dedicated application may be embedded into the operating system of mobile device 209, eliminating the need to manually open the application. Instead, viewer 110 may touch a button or similar, such as a physical button or one on a graphical user interface (GUI) to start the process. Either way, mobile device can 209 access digital camera 287 and start recording/acquiring images and/or video therefrom, and thus capture an encoded signal emitted in that particular view direction.

Figure 4:
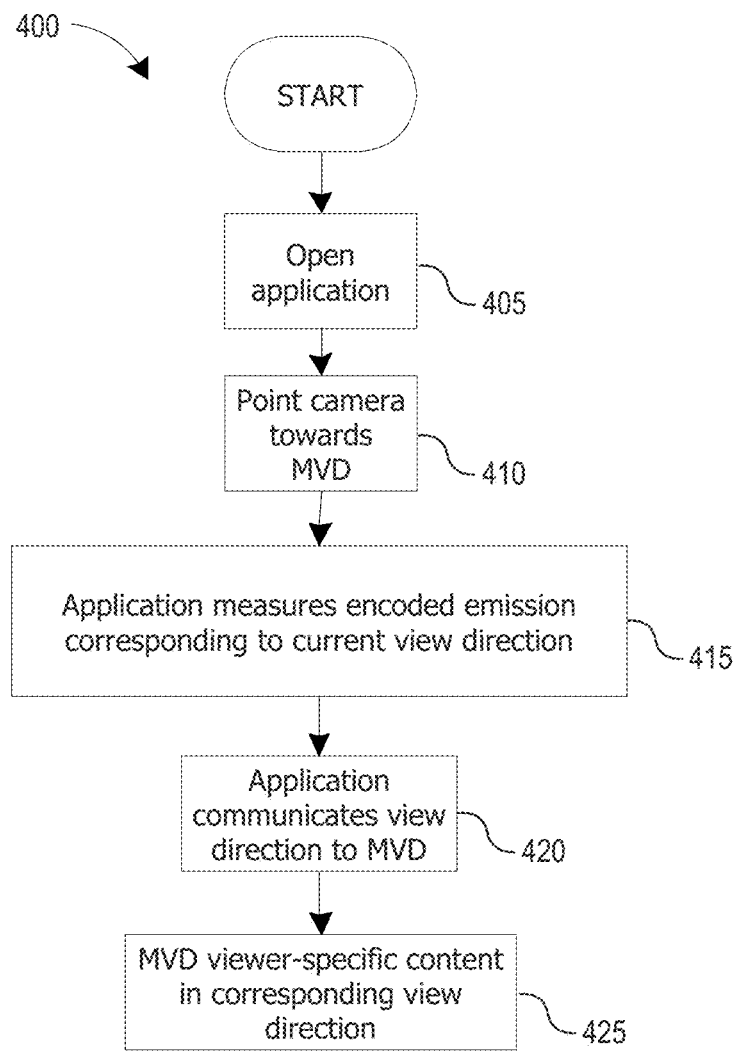
FIG. 4 is a process flow diagram of an illustrative multiview self-identification method, in accordance with one embodiment.
Figure 6A:
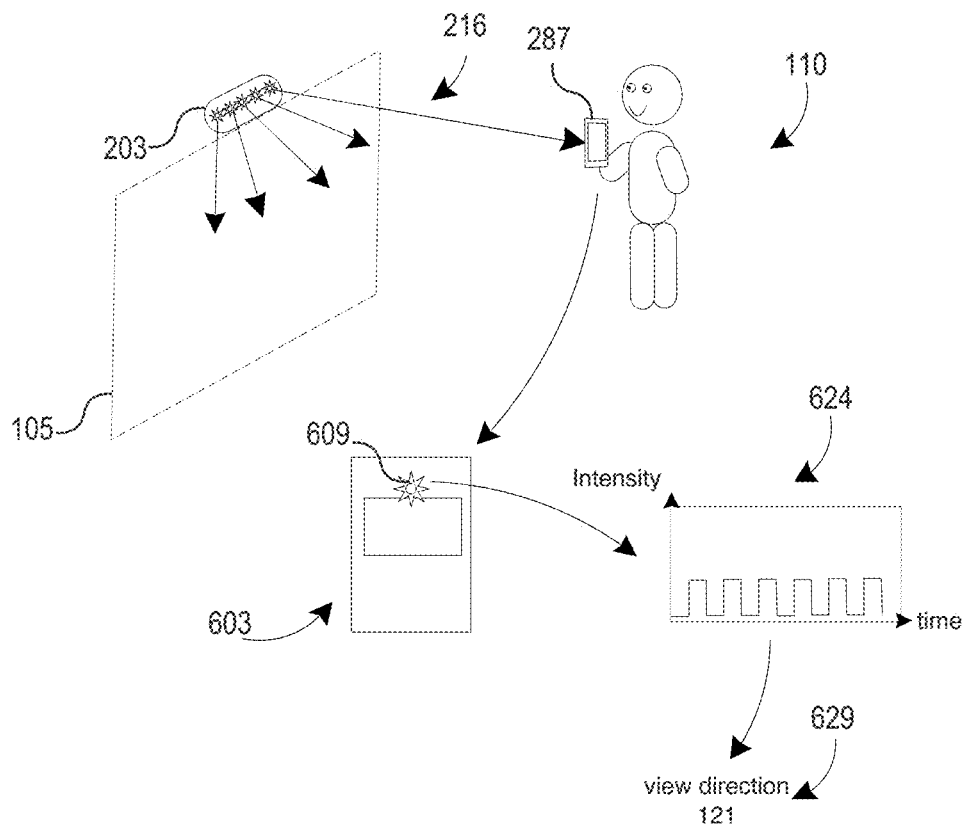
FIGS. 6A to 6C are schematic diagrams illustrating certain process steps of FIGS. 4 and 5, in accordance with one embodiment.

For example, and with added reference to the process 400 illustrated in FIG. 4, once a corresponding application has been launched or activated at step 405, at step 410, viewer 110 can point camera 287 towards MVD 105 and emitter array 203. In some embodiments, there may be no need to interact with the image acquisition process (e.g. zoom, tilt, move, etc.). Indeed, as long as the time-dependent encoded emission perceived from emitter array 203 corresponding to the physical location and viewing direction of viewer 105 is within the frame, mobile device 209 (via dedicated application/software) may be operable to extract therefrom the encoded data at step 415. This is schematically illustrated in FIG. 6A, wherein mobile camera 287 is used by viewer 110 (via the dedicated application) to record a video segment and/or series of images 603 comprising encoded emission 216. The dedicated application applies any known image recognition method to locate the emission of emitter 609 within image 603 and extract therefrom the corresponding pulsatile encoded transmission 624, thereby extracting the corresponding viewing direction data 629.

In some embodiments, a notification and/or message may be presented to the viewer on the mobile device to confirm that the encoded emission was correctly located and decoded, to display the decoded location, and/or to authorize further processing of the received location information and downstream MVD process. It will be appreciated that while the viewing location may be immediately decoded and confirmed, the encoded information may rather remain as such until further processed downstream by the system.

Figure 6B:
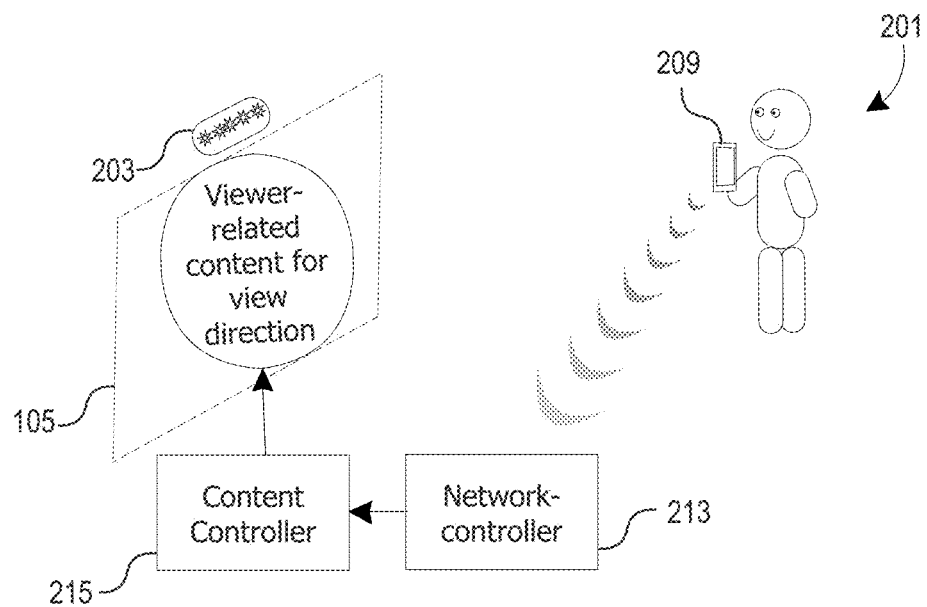

Once the view-related data 629 has been captured, the mobile device can communicate at step 420 this information to MVD 105 (using wireless network interface 267), optionally along with viewer-related data. This viewer-related data can be used, for example, to derive viewer-related content to be presented or displayed on MVD 105. In some embodiments, viewer-related data may comprise a language preference or similar, while in other embodiments it may comprise viewer-specific information, including personal information (e.g. personalized flight information, etc.). In some embodiments, as illustrated in FIG. 6B, mobile device 209 communicates directly with network controller 213 of self-identification system 200, which may in this example be uniquely connected to MVD 105 (either integrated into MVD 105 or included within the same hardware unit as emitter array 203, for example). Once network-controller 213 receives this viewing direction data and viewer-specific data, it relays it to content-controller 215, which uses it to display viewer-related content on MVD 105 via the corresponding viewing direction 121.

Figure 5:
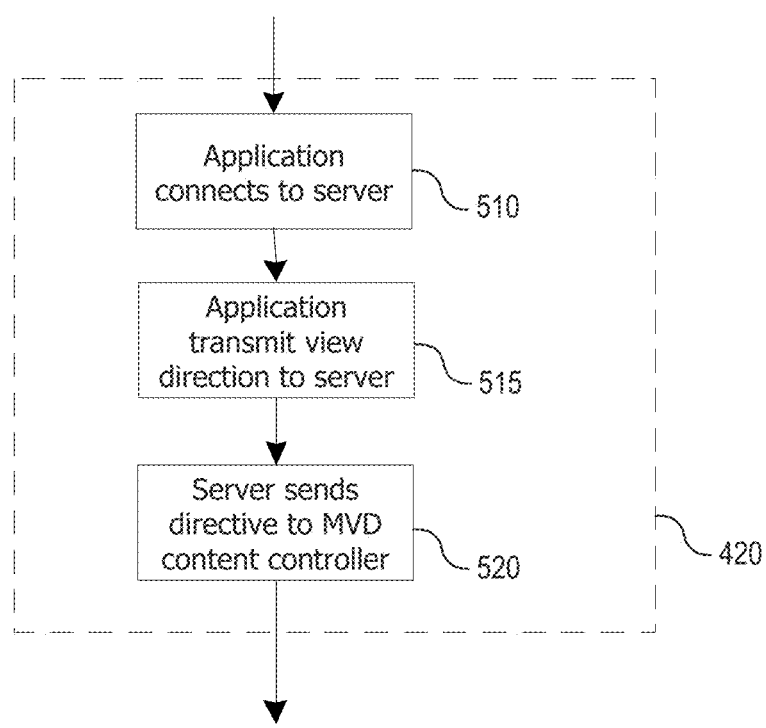
FIG. 5 is a process flow diagram of an alternative process step of FIG. 4, in accordance with one embodiment.
Figure 6C:
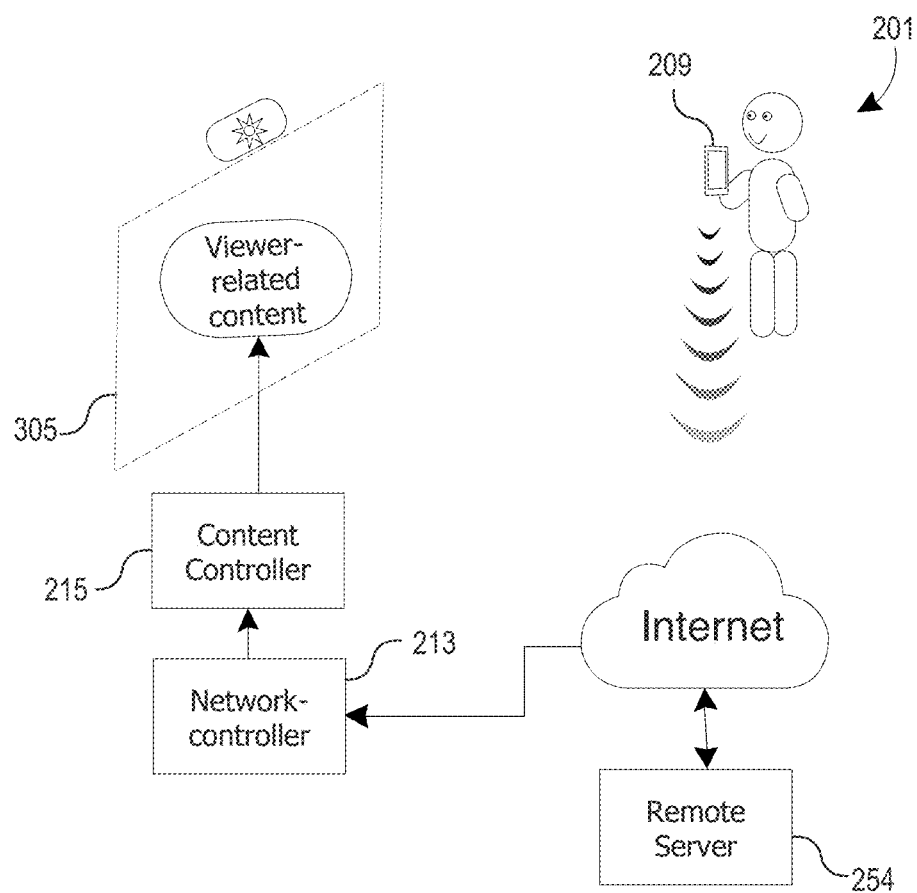

Alternatively, as shown in FIG. 5 and illustrated schematically in FIG. 6C, and according to another embodiment, step 415 may be modified to include communicating to remote server 254 instead. At step 510 of FIG. 5, instead of connecting directly with network-interface 225 of system 200, mobile device 209 may communicate with remote server 254, by way of a wireless internet connection. At step 515, mobile device 209 may then communicate viewing direction data and viewer-related data. In addition, in this example, additional data identifying for example MVD 105 in a network of connected MVDs may also be provided in the encoded emission. In this exemplary embodiment, remote server 254 may be part of a cloud service or similar, which links multiple MVDs over a network and wherein the dedicated application for mobile device 209 may be configured to communicate user-related data (e.g. user profile, user identification, user preferences, etc.). At step 520, remote server 254 may then connect and communicate with network-interface 225 of system 200. In some embodiments, selected view-related data may be directly selected by the mobile application and relayed to the system for consideration. In other embodiments, a user identifier may otherwise be relayed to the remote server 254, which may have operative access to a database of stored user profiles, and related information, so to extract therefrom user-related data usable in selecting specific or appropriate user and view-direction/location content.

In some embodiments, additional information such as the physical location of MVD 105 may be encoded in the encoded emission itself or derived indirectly from the location of the mobile device 209 (via a GPS or similar).

In some embodiments, viewer-specific content may comprise any multimedia content, including but without limitation, text, images, photographs, videos, etc. In some cases, viewer-related content may be a same content but presented in a different way, or in a different language.

In some embodiments, the viewer may have the option of interacting dynamically with the dedicated mobile application to control which viewer-related content is to be displayed in the corresponding view direction of the MVD 105. In other cases, the viewer may pre-configure, before interacting with the MVD, the dedicated application to select one or more viewer-specific content, and/or pre-configure the application to communicate to MVD 105 to display viewer-specific content based on a set of predefined parameters (e.g. preferred language, etc.).

In practice, the viewing of conventional MVD systems, examples of which may include, but are not limited to, those abovementioned, may traditionally be accompanied by various visual artifacts that may detract from or diminish the quality of a user viewing experience. For instance, a MVD system employing a light field shaping element (e.g. a parallax barrier, a lenslet array, a lenticular array, waveguides, and the like) may be designed or otherwise operable to display light from different pixels to respective eyes of a viewer in a narrow angular range (or small region of space). In some cases, even a slight movement of a viewer may result in one eye perceiving light intended for the other eye. Similarly, when viewing a MVD operative to display different images to different viewers, user movement may result in the presentation of two different images or portions thereof to a single viewer if pixels intended to be blocked or otherwise unseen by that user become visible. Such visual artifacts, referred to herein interchangeably as "ghosting" or "crosstalk", may result in a poor viewing experience.

While various approaches have been proposed to mitigate ghosting in stereoscopic systems, such as that disclosed by International Patent Application WO 2014/014603 A3 entitled "Crosstalk reduction with location-based adjustment" and issued to Dane and Bhaskaran on Sep. 4, 2014, a need exists for a system and method of rendering images in a manner that improves user experience for MVD systems that, for instance, do not provide an adverse impact on a neighbouring view (e.g. compensate for a neighbour view by adjusting a pixel value, detracting from the quality of one or more displayed images). Furthermore, a need exists for a system and method to this end that is less computationally intensive than the dynamic adjustments required to apply corrective contrast measures, such as those that might reverse a ghosting effect, for individually identified pixels for certain images. As such, herein disclosed are various systems and methods that, in accordance with various embodiments, relate to rendering images in MVDs that improve user experience via mitigation of ghosting and/or crosstalk effects.

In accordance with various embodiments, a parallax barrier as described herein may be applied to a MVD wherein each view thereof displayed relates to a different user, or to different perspectives for a single viewer. However, a parallax barrier is not required in order to obtain directional content for a multiview display. For instance, various means known in the art for providing a plurality of content (e.g. images, videos, text, etc.) in multiple directions, such as lenslet arrays, lenticular arrays, waveguides, combinations thereof, and the like, fall within the scope of the disclosure.

Furthermore, various aspects relate to the creation of distinct view zones that may be wide enough to encompass both eyes of an individual viewer, or one eye of a single user within a single view zone, according to the context in which a MVD may be used, while mitigating crosstalk between different views.

Description will now be provided for various embodiments that relate to MVD systems that comprise a parallax barrier, although the skilled artisan will appreciate that other light field shaping elements may be employed in the systems and methods herein described.

Conventional parallax barriers may comprise a series of barriers that block a fraction $(N-1)/N$ of available display pixels while displaying N distinct views in order to display distinct images. Such systems may provide a high resolution and brightness for each view. For example, a MVD displaying two views (i.e. N=2) may have half of its pixels used for a first view zone, while the other half (blocked from the first view zone) are used for a second view zone. In such a system, narrow view zones are created such that even minute displacement from an ideal location may result in crosstalk, reducing image quality due to ghosting from adjacent views.

In accordance with various embodiments, ghosting may be at least partially addressed by effectively creating "blank" views between those intended for viewing that comprise pixels for image formation. That is, some pixels that would otherwise be used for image formation may act as a buffer between views. For instance, and in accordance with various embodiments, such buffers may be formed by maintaining such pixels inactive, unlit, and/or blank. Such embodiments may allow for a greater extent of viewer motion before crosstalk between view zones may occur, and thus may improve user experience. For instance, in the abovementioned example of a MVD with N views, a barrier may block a fraction of (2N−1)/2N pixels in an embodiment in which view zones are separated by equal-width blank "viewing zones". That is, for a MVD displaying two views (N=2), four "views" may be created, wherein each view containing different images is separated by a "view" that does not contain an image, resulting in 75% of pixels being blocked by a barrier while 25% are used to create each of the two images to be viewed.

The abovementioned embodiment may reduce ghosting effects, as a viewer (i.e. a pupil, or both eyes of a user) may need to completely span the width of a view zone to perceive pixels emitting light corresponding to different images. However, the images formed by such systems or methods may have reduced brightness and/or resolution due to the number of pixels that are sacrificed to create blank views. One approach to mitigating this effect, and in accordance with various embodiments, is to address pixels in clusters, wherein clusters of pixels are separate from one another by one or more blank pixels. For instance, and in accordance with at least one of the various embodiments, a cluster may comprise a "group" or subset of four cohesively distributed (i.e. juxtaposed) pixels and utilised to produce a portion of an image, and clusters may be separated by a width of a designated number of pixels that may be left blank, unlit, or inactive, or again activated in accordance with a designated buffer pixel value (i.e. buffer pixel(s)). While the following description refers to a one-dimensional array of pixels grouped into clusters of four pixels each, the skilled artisan will appreciate that the concepts herein taught may also apply to two-dimensional arrays of pixels and/or clusters, wherein clusters may comprise any size in one or two dimensions While this particular example (four active pixels to one blank pixel) may provide an appropriate ratio of used or lit pixels to blank or unlit pixels for a high quality viewing experience in some systems, the skilled artisan will appreciate that various embodiments may comprise different ratios of active to blank pixels, or variable ratios thereof, while remaining within the scope of the disclosure. For instance, various embodiments may comprise varying the ratio of active to blank pixels throughout a dimension of a display, or, may comprise varying the ratio of active to blank pixels based on the complexity of an image or image portion. Such variable ratio embodiments may be particularly advantageous in, for instance, a lenticular array-based MVD, or other such MVD systems that do not rely on a static element (e.g. a parallax barrier) to provide directional light.

As such, various embodiments as described herein may comprise the designated usage and/or activation of pixels in a display in addition to, or as an alternative to, a physical barrier or light field shaping elements (e.g. lenses) that allow light from specific regions of a display to be seen at designated viewing angles (i.e. directional light). Dynamic or designated pixel activation sequences or processes may be carried out by a digital data processor directly or remotely associated with the MVD, such as a graphics controller, image processor, or the like.

To further describe a physical parallax barrier that may be used in accordance with various embodiments, the notation PB (N, p, b) will be used henceforth, where PB is a physical parallax barrier used with a display creating N views, where p is the number of pixels in a cluster, as described above, designated as active to contribute to a particular image or view, wherein clusters may be separated by a number of pixels b that may be blank, inactive, or unlit. In accordance with various embodiments, b may be 0 where blank pixels are not introduced between view-defining clusters, or otherwise at least 1 where one or more blank pixels are introduced between view-defining clusters.

Embodiments may also be described by an effective pixel size $s_{px}^*$ representing the size of a pixel projection on the plane corresponding to a physical parallax barrier. The slit width SW of the physical barrier may thus be defined as SW=$p\, s_{px}^*$, and the physical barrier width between slits BW as BW=$[(N-1)p+N\, b]\, s_{px}^*$. It may also be noted that, for a system in which D is the distance between the parallax barrier and a viewer and g is the gap between the screen and the physical barrier plane (i.e. D+g relates to the distance between the viewer and the screen), the effective pixel size $s_{px}^*$ may be computed as $s_{px}^* , s_{px}[D/(D+g)]$, where $s_{px}$ is the screen's actual pixel size (or pixel pitch).

Figure 7:
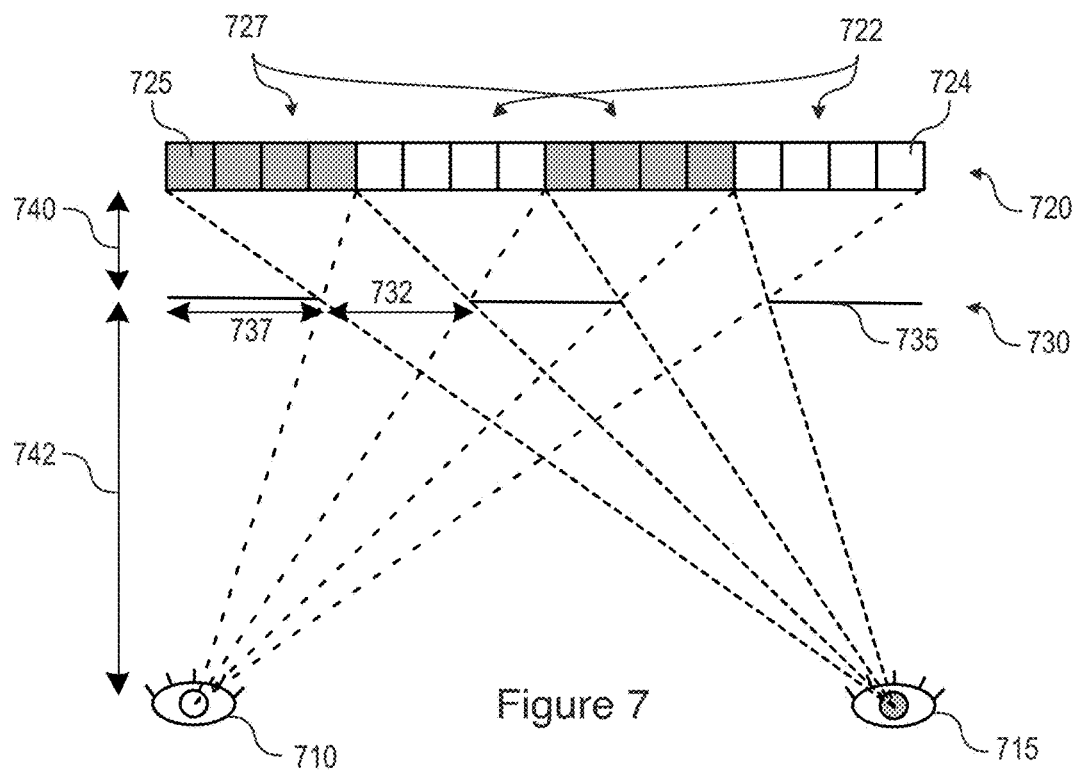
FIG. 7 is a schematic diagram illustrating an array of pixels in a multiview display system operable to display two images, in accordance with various embodiments.

A geometry of a conventional parallax barrier MVD system is further described in FIG. 7, which illustrates, using the abovementioned notation, a parallax barrier of PB (2, 4, 0). In this example, 2 views (N=2, where pixels corresponding to different images are referred to as white or dark, for illustrative purposes only) are created using clusters of 4 pixels each, wherein each cluster is separated by 0 blank pixels. Here, white clusters 722 of white pixels 724 corresponding to a first image to be displayed by screen 720 are only visible through a parallax barrier 730 to a first viewer 710 through slits of slit width 734 (SW) in the barrier 730. Dark clusters 727 of dark pixels 725 are, from the perspective of the first viewer 710, blocked by barriers 735 of barrier width 737 (BW), while those same dark pixel clusters 727 are visible to a second viewer 715. In this case, the barrier 730 is at a gap distance 740 (g) away from the screen 720, while the first viewer 710 is at a distance 742 (D) away from the barrier 730. As described above, such a system may be sensitive to crosstalk/ghosting effects. Indeed, even a slight movement from the first viewer 710 would result in perception of one or more dark pixels 725, while movement from the second viewer 715 would result in perceived images being contaminated with white pixels 724.

Figure 8:
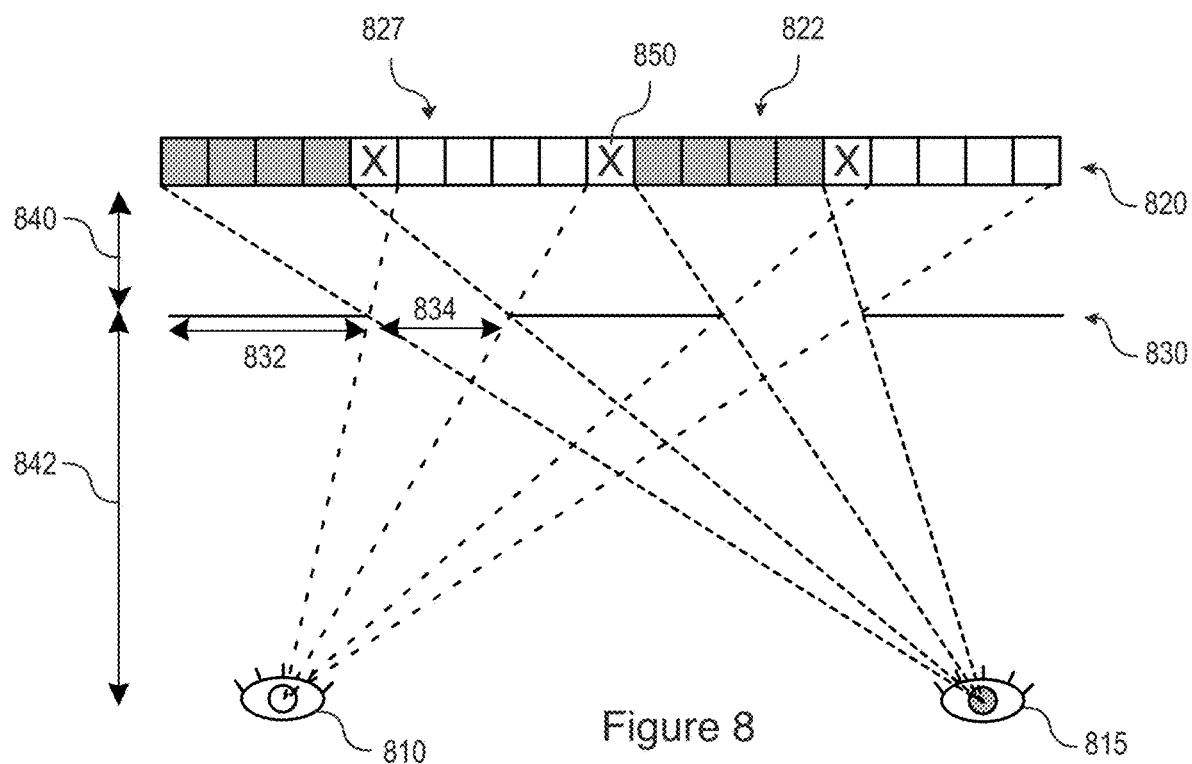
FIG. 8 is a schematic diagram illustrating an array of pixels in a multiview display system wherein pixels corresponding to different views are separated by an unlit pixel, in accordance with various embodiments.

FIG. 8, on the other hand, incorporates blank pixels 850 within a display 820, in accordance with various embodiments. In this example, denoted PB (2, 4, 1), white clusters 827 of four white pixels are visible to a first viewer 810 through slits of width 834, while dark clusters 822 of 4 dark pixels each are blocked to the first viewer 810 by barriers of width 832. conversely, a second viewer 815 may see clusters of dark pixels 822, while the barriers block the second viewer from perceiving white clusters 827. In this case, the parallax barrier 830 is a gap distance 840 from the screen 820, while the first viewer is a distance 842 from the parallax barrier. Unlike the example of FIG. 7, in FIG. 8, if either viewer shifts position in any direction, they will not immediately be presented with pixels corresponding to a different image. Rather, upon movement, their field of view will first incorporate a blank pixel 850 (marked with an 'X' in FIG. 8), which is inactive, and thus not producing light that will result in crosstalk. Thus, the presence of blank pixels at designated locations reduces ghosting effects in a MVD system, in accordance with various embodiments.

In the example of FIG. 8, wherein N=2, p=4, and b=1, 80% of the number of pixels that would have otherwise been used to form a particular image in FIG. 7 may be active. As such, only 20% of the resolution is lost compared to that of FIG. 7, which comprised an "optimal" barrier in that all pixels were used to form an image. However, the perception of ghosting may be significantly reduced, even in embodiments wherein only a single pixel is used to separate clusters of image-producing pixels.

In accordance with various embodiments, the presence of blank, unlit, or inactive pixels may effectively increase a viewing zone size. That is, a viewer may comfortably experience a larger area wherein their view or perception does not experience significant ghosting.

In accordance with various embodiments, blank pixels may be placed at the interface between adjacent clusters of pixels corresponding to different images and/or content. Such configurations may, in accordance with various embodiments, provide a high degree of resolution and/or brightness in images while minimizing crosstalk.

The following Table provides non-limiting examples of display pixel parameters that may relate to various embodiments, with the associated percentage of a total number of available pixels on a display that correspond to a particular image or view, and thus relate to resolution and brightness of a respective image. The skilled artisan will appreciate that such parameters are exemplary, only, and do no limit the scope of the disclosure. Furthermore, the skilled artisan will appreciate that while such parameters may, in accordance with some embodiments, refer to a number of pixels in one dimension, they may also apply to methods and systems operable in two dimensions. For instance, a pixel cluster may be a p by r array of pixels cohesively distributed in two dimensions on a display. In some embodiments, buffer regions of unlit pixels may be variable in different dimensions (e.g. a buffer width of b pixels between clusters in a horizontal direction and c pixels between clusters in a vertical direction).

| N | P | b | % per view (%) |
|---|---|---|---|
| 2 | 4 | 1 | 40 |
| 2 | 2 | 1 | 33 |
| 2 | 2 | 0 | 50 |
| 2 | 1 | 1 | 25 |
| 3 | 1 | 0 | 33 |
| 3 | 3 | 1 | 25 |
| 3 | 2 | 0 | 33 |
| 4 | 1 | 0 | 25 |

While various examples described relate to MVD displays comprising parallax barriers, the skilled artisan will appreciate that the systems and method herein disclosed may relate to other forms of MVD displays. For instance, and without limitation, blank or inactive pixels may be employed with MVD displays comprising lenticular arrays, wherein directional light is provided through focusing elements. For instance, the principle of effectively "expanding" a view zone via blank pixels that do not contribute to crosstalk between views in such embodiments remains similar to that herein described for the embodiments discussed above.

Further embodiments may relate to the employ of unlit pixels in dynamic image rendering (e.g. scrolling text, videos, etc.) to reduce crosstalk or ghosting. Similarly, yet other embodiments relate to the use of blank pixels to reduce ghosting related to systems that employ dynamic pupil or user tracking, wherein images are rendered, for instance, on demand to correspond to a determined user location, or predicted location (e.g. predictive location tracking). Similarly, embodiments may relate to a view zone that encompasses one or more eyes of a single user, the provision of stereoscopic images wherein each eye of a user is in a respective view zone, or providing a view zone corresponding the entirety of a user, for instance to provide a neighbouring view zone for an additional user(s).

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A multiview system operable to interface with a mobile device of a given viewer, the system comprising:
a Multi View Display (MVD) operable to display distinct content in two or more distinct viewing directions relative to the MVD;
a network-interfacing content-controller, independent of the mobile device, operable to select direction-specific content to be displayed by the MVD along each of said distinct viewing directions;
one or more emitters disposed and operable to emit a respectively encoded time-variable emission in each of said distinct viewing directions, wherein each said encoded time-variable emission encodes a direction-related identifier associated with a respective one of said viewing directions; and
a mobile application operable on the mobile device of the given viewer to capture a given one of said encoded time-variable emissions when the mobile device is located so to intersect a corresponding one of said distinct directions so to self-identify the mobile device as being substantially in line with a corresponding one of said distinct viewing directions, and communicate viewer-related data and the direction-related identifier identifiable from said given one of said encoded time-variable emission to said content-controller;
wherein said network-interfacing content-controller is further operable to:
receive communication of said viewer-related data and direction-related identifier;
select content based on said viewer-related data and said direction-related identifier to be displayed along said given one of said distinct viewing directions; and
invoke display of said selected content via said MVD along said given one of said distinct viewing directions.

2. The system of claim 1, wherein said encoded time-variable emission comprises an encoded pulsatile waveform.

3. The system of claim 2, wherein said pulsatile waveform has a frequency of 38 kHz.

4. The system of claim 1, wherein said one or more emitters comprise one or more infrared (IR) or near-IR (NIR) emitters.

5. The system of claim 1, wherein each of said one or more emitters comprises a light source installed recessed in a sleeve so as to impart directionality to said encoded emission thereof.

6. The system of claim 1, wherein said one or more emitters comprise a beam-forming optics disposed so as to impart directionality to said encoded emission thereof.

7. The system of claim 1, wherein said one or more emitters comprise a directional laser light source.

8. The system of claim 1, wherein said selected content comprises at least one of a text, an image, a video, a symbol, an icon or a code.

9. The system of claim 1, wherein said selected content comprises text, and wherein said viewer-related data comprises a viewer language preference.

10. The system of claim 1, wherein said one or more emitters comprises multiple emitters respectively disposed so to correspond with each of said distinct viewing directions.

11. A computer-implemented method, implemented by one or more digital data processors, for displaying viewer-related content along a given view direction of a MultiView Display (MVD), the MVD operable to display distinct viewer-related content in two or more distinct viewing directions relative to the display, the method comprising:
emitting respective encoded time-variable emissions, wherein each of said encoded time-variable emissions is substantially aligned with and encodes a corresponding viewing direction of the MVD;
capturing via an optical sensor of a portable communication device located within a given view direction a corresponding encoded time-variable emission;
extracting a direction-related identifier from said corresponding encoded time-variable emission;
communicating, via said portable communication device, viewer-related data, and a direction-related identifier identifiable from said corresponding encoded time-variable emission, to a network-interfacing content controller communicatively linked to the MVD;
selecting, via said content controller, viewer-related content based on said viewer-related data; and
displaying, via said content controller and the MVD, said viewer-related content in said given view direction corresponding to said direction-related identifier.

12. The method of claim 11, wherein said encoded time-variable emission comprises an encoded pulsatile waveform.

13. The method of claim 12, wherein said pulsatile waveform has a frequency of 38 kHz.

14. A non-transitory computer-readable medium comprising digital instructions to be implemented by a digital data processor for displaying viewer-related content along a given view direction of a Multi View Display (MVD), the MVD operable to display distinct viewer-related content in two or more distinct viewing directions relative to the display, the instructions for:
emitting respective encoded time-variable emissions, wherein each of said encoded time-variable emissions is substantially aligned with and encodes a corresponding viewing direction of the MVD;
capturing via an optical sensor of a portable communication device located within a given view direction a corresponding encoded time-variable emission;
extracting a direction-related identifier from said corresponding encoded time-variable emission;
communicating, via said portable communication device, viewer-related data, and a direction-related identifier identifiable from said corresponding encoded time-variable emission, to a network-interfacing content controller communicatively linked to the MVD;
selecting, via said content controller, viewer-related content based on said viewer-related data; and
displaying, via said content controller and the MVD, said viewer-related content in said given view direction corresponding to said direction-related identifier.

15. The non-transitory computer-readable medium of claim 14, wherein said encoded time-variable encoded emission comprises an encoded pulsatile waveform.

16. A multiview content selection system for selecting viewer-related content to be displayed along respective views of a MultiView Display (MVD) that is operable to display distinct content in two or more distinct viewing directions, the system comprising:
a network-interfacing content-controller operable to select direction-specific content to be displayed by the MVD along each of said distinct viewing directions;
one or more emitters disposed and operable to emit a respectively encoded time-variable emission in each of said distinct viewing directions, wherein each said encoded time-variable emission encodes a direction-related identifier associated with a respective one of said viewing directions; and a mobile application, independent of the network-interfacing content-controller, operable on a mobile device of a given viewer to receive a given one of said encoded time-variable emissions when the mobile device is located so to intersect a corresponding one of said distinct directions so to self-identify the mobile device as being substantially in line with a corresponding one of said distinct viewing directions, and communicate viewer-related data and a direction-related identifier identifiable from said given one of said encoded time-variable emission to said content-controller;

wherein said network-interfacing content-controller is further operable to:

receive communication of said viewer-related data and said direction-related identifier;

select content based on said viewer-related data; and invoke display of said selected content via the MVD along said corresponding one of said distinct viewing directions corresponding with said direction-related identifier.

17. The system of claim 16, further comprising the MVD.

18. The system of claim 17, wherein the MVD comprises a dynamically variable MVD operable to dynamically vary angular view zone boundaries, and wherein said one or more emitters are operable to correspondingly vary emission of each said respectively encoded time-variable emission in each of said distinct viewing directions in concert with said dynamically variable MVD.

19. The system of claim 16, wherein said encoded time-variable emission comprises an encoded pulsatile waveform.

20. The system of claim 19, wherein said one or more emitters comprise one or more infrared (IR) or near-IR (NIR) emitters.

21. The system of claim 16, wherein each of said one or more emitters comprises at least one of a light source installed recessed in a sleeve so as to impart directionality to said encoded emission thereof, a beam-forming optics disposed so as to impart directionality to said encoded emission thereof, or a directional laser light source.

22. The system of claim 16, wherein said one or more emitters comprises multiple emitters respectively disposed so to correspond with each of said distinct viewing directions.

* * * * *